(12) United States Patent
Yarita et al.

(10) Patent No.: US 6,956,548 B2
(45) Date of Patent: Oct. 18, 2005

(54) DISPLAY DEVICE

(75) Inventors: Katsuhiko Yarita, Mobara (JP); Hiroyuki Takahashi, Funabashi (JP)

(73) Assignee: Hitachi, Ltd., Tokyo (JP)

( * ) Notice: Subject to any disclaimer, the term of this patent is extended or adjusted under 35 U.S.C. 154(b) by 349 days.

(21) Appl. No.: 10/230,218

(22) Filed: Aug. 29, 2002

(65) Prior Publication Data

US 2003/0058205 A1    Mar. 27, 2003

(30) Foreign Application Priority Data

Sep. 26, 2001  (JP) ............................. 2001-293896

(51) Int. Cl.⁷ ................................................ G09G 3/36
(52) U.S. Cl. ...................................... 345/87; 349/149
(58) Field of Search ............................ 345/87, 98, 99, 345/100, 690, 691; 349/149–152

(56) References Cited

U.S. PATENT DOCUMENTS

| 5,703,610 | A | | 12/1997 | Kishino et al. | |
|---|---|---|---|---|---|
| 5,737,053 | A | * | 4/1998 | Yomogihara et al. | 349/149 |
| 5,777,610 | A | * | 7/1998 | Sugimoto et al. | 345/206 |
| 6,266,120 | B1 | * | 7/2001 | Han | 349/150 |
| 6,373,544 | B1 | * | 4/2002 | Hirabayashi | 349/149 |
| 2001/0026345 | A1 | * | 10/2001 | Park et al. | 349/149 |
| 2002/0093616 | A1 | * | 7/2002 | Park et al. | 349/149 |

FOREIGN PATENT DOCUMENTS

| JP | 8-241681 A | 3/1995 |
|---|---|---|
| JP | 11-282002 | 3/1998 |
| TW | 329004 | 3/1996 |

* cited by examiner

*Primary Examiner*—Kent Chang
(74) *Attorney, Agent, or Firm*—Reed Smith LLP; Stanley P. Fisher, Esq.; Juan Carlos A. Marquez, Esq.

(57) ABSTRACT

Let a drive circuit chip shrink in outer shape size to thereby enable miniaturization of a display device as a whole.

The display device is equipped with a plurality of pixels disposed on a substrate in the form of a matrix and more than one drive circuit chip GDR as mounted on the substrate for causing these pixels to perform a display operation, wherein the drive circuit chip GDR has a plurality of output terminals OT for connection to output wiring lines GL formed on the substrate and a plurality of dummy terminals DT disposed adjacent to one another, and wherein at least one of the output wiring lines GL connected to the output terminals OT is not connected to any one of the dummy terminals DT and is disposed to pass through between the mutually adjacent dummy terminals DT.

11 Claims, 6 Drawing Sheets

DISPLAY DEVICE

BACKGROUND OF THE INVENTION

The present invention relates generally to display devices and, more particularly, to a display device of the so-called panel type having a plurality of picture elements or "pixels" which are disposed on a substrate in a matrix form and more than one drive circuit chip for driving these pixels.

Light weight and slim size of display devices of the panel type are presently used as display devices for personal computers (PCs) and handheld or "mobile" wireless telephone handsets plus mobile electronic information terminals such as personal digital assistant (PDA) tools and also as monitors of a variety of types of information equipment. Currently known examples of such panel-type display devices include liquid crystal display (LCD) panels, electroluminescence (EL) panels, plasma panels, and field emission display (FED) devices with more than one carbon nano-tube (CNT) or the like as the electron source thereof.

A typical one of the panel-type display devices of this type is designed so that a plurality of pixels are disposed in the form of a matrix at a gape space between a pair of spatially adhered substrates to thereby provide a display region while mounting drive circuitry for driving the pixels outside of the display region. The pixels which are laid out in the matrix form are disposed at cross points or "intersections" between a group of parallel drive lines extending in one direction of a substrate surface and a group of drive lines extending in another direction crossing this direction, respectively. Although various pixel design methods are presently available, one approach is to employ a simple matrix scheme which utilizes voltage superposition at an intersection between the both drive lines. Another approach is to use an active matrix scheme which performs selection on a per-pixel basis to turn on.

In recent years, the active matrix scheme for performing selection in units of pixels to turn on is accepted among those skilled in the art as the major approach from viewpoints of enhanced performances, such as image resolutions, contrasts and operation speeds. In display devices of any scheme also, more than one drive circuit is provided outside of the display region in order to supply a drive voltage or display signal to a respective one of the drive lines. Typically this type of drive circuit is provided in the form of a semiconductor chip (referred to as "drive circuit chip" hereinafter) on a substrate or alternatively at the periphery of such substrate.

A typical liquid crystal display device of the type using the active matrix scheme is arranged to have a pair of substrates spatially bonded together with a layer of liquid crystal material filled in a thin gap space therebetween, wherein one substrate has its inner surface on which switching elements for pixel selection use and scan lines for applying a scan voltage(s) to the switching elements along with data lines for display data application and pixel electrodes or the like are formed whereas the other substrate comes with opposite or "counter" electrodes opposing the pixel electrodes or a color filter(s) or the like as formed thereon. Here, letting a widely used liquid crystal display device with thin-film transistors (TFTs) as the switching elements be an example, an arrangement of its drive circuit chip will be explained below. Due to this, an explanation will be given under an assumption that the scan lines for scan voltage application are regarded as gate lines whereas the data lines for display data application are drain lines.

Figure 7:
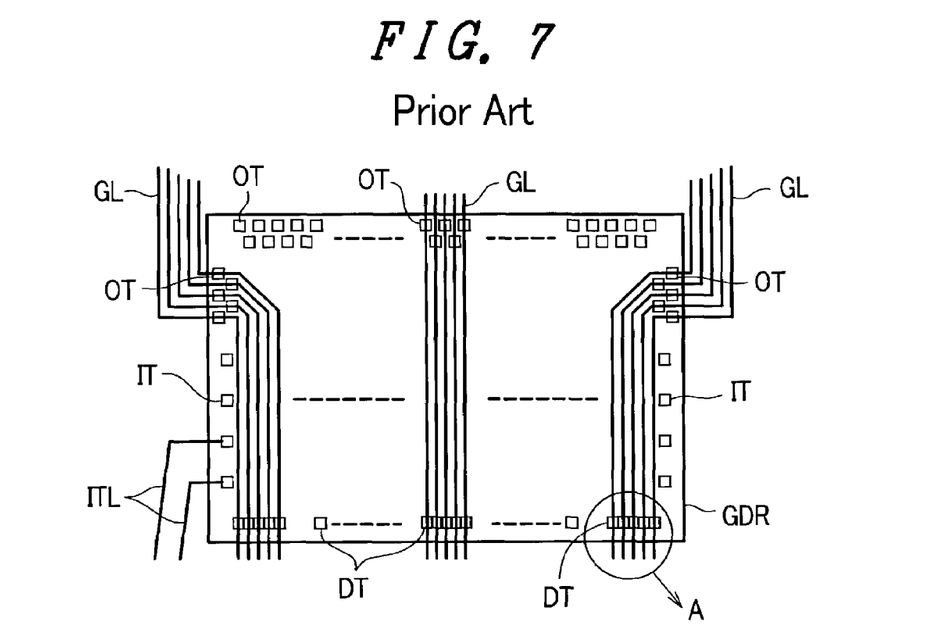
FIG. 7 is a diagram showing a pictorial representation for explanation of an arrangement of the ventral surface (parts-mount face) of a gate drive circuit chip for drive voltage application to gate lines—this is one of the drive circuits used to apply a drive voltage(s) to the drive lines of a liquid crystal display device—along with an exemplary layout of printed wiring lines as formed on a substrate.

FIG. 7 is a diagram showing a pictorial representation for explanation of an arrangement of a ventral surface (parts-mount face) of a gate drive circuit chip which applies a drive voltage to the gate lines—this is one of the drive circuits for drive voltage application to the drive lines of a liquid crystal display device—along with an example of a printed wiring line layout as formed on a substrate. The gate drive circuit chip (simply referred to as "drive circuit chip" also hereinafter) GDR which is indicated by solid external shape lines or outlines has on its ventral surface a great number of input terminals IT and multiple output terminals OT along with dummy terminals DT, wherein this ventral surface is mounted onto a substrate with input wiring lines ITL and gate wiring lines GL formed thereon. The terminals of this type are also called bumps.

In this example, the input terminals IT are organized into two linear arrays disposed along the opposite peripheral edges—namely, the right and left side edges when seeing the attached drawing sheet of FIG. 7—of the drive circuit chip GDR. The input wiring lines ITL are formed on the substrate side in a way corresponding to the input terminals IT. Optionally, another example is available in which the input terminals IT are modified to reach up to the right and left ends of a lower peripheral edge of the drive circuit chip GDR. The output terminals OT for connection to the gate lines GL as formed in the display region placed at upper part of FIG. 7 are located at an upper peripheral edge of the drive circuit chip GDR, with the dummy terminals DT being formed along a lower peripheral edge thereof.

Figure 9:
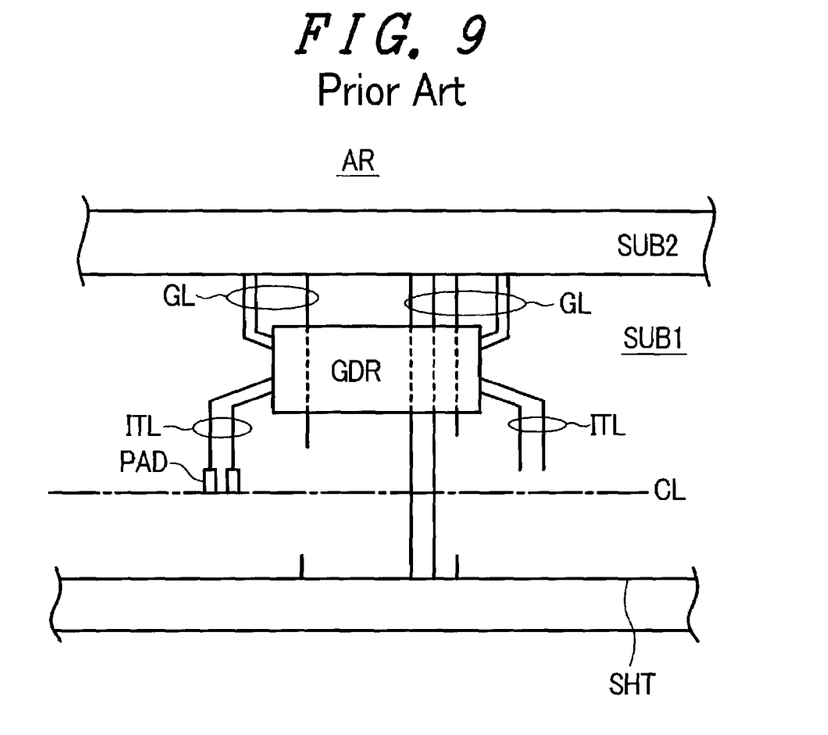
FIG. 9 is a main-part plan view diagram for explanation of an arrangement example at the intermediate manufacture stage of a substrate which mounts thereon the drive circuit chip.
Figure 10:
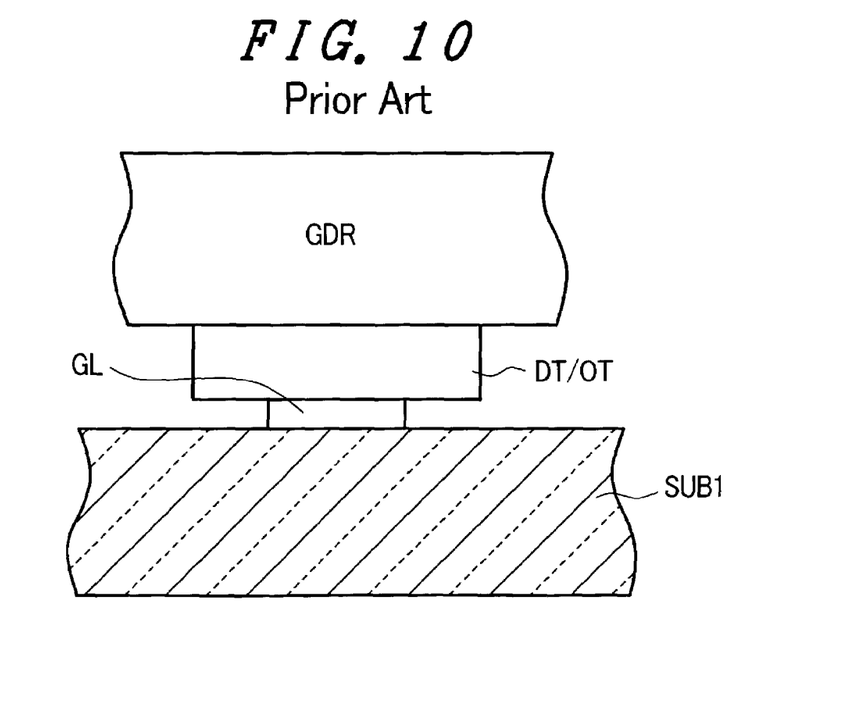
FIG. 10 is an explanation diagram of the connection state of either an output terminal or a dummy terminal of the drive circuit chip being mounted on the substrate with respect to a gate line associated therewith.

As shown in FIG. 10, a gate line GL which extends from the display region is connected to an output terminal OT that is formed on the drive circuit chip GDR and extends so that it runs beneath the ventral surface of the drive circuit chip GDR to reach a terminate end face of the substrate via a dummy terminal DT which is present at the lower peripheral edge. Note here that at an intermediate manufacturing stage of this display device, an electrical shortcircuiting or shorting line is provided at a portion which is further below the lower edge, wherein the above-noted gate line GL is connected to this shorting line. The short line is cut and removed away together with the substrate at a pre-stage at which it becomes a final product. This arrangement is shown in FIG. 9.

Figure 8A:
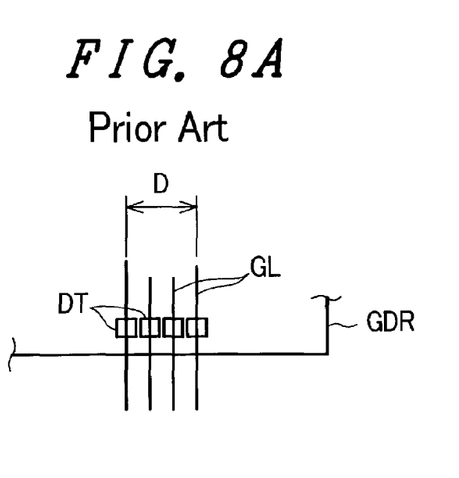
Figure 8B:
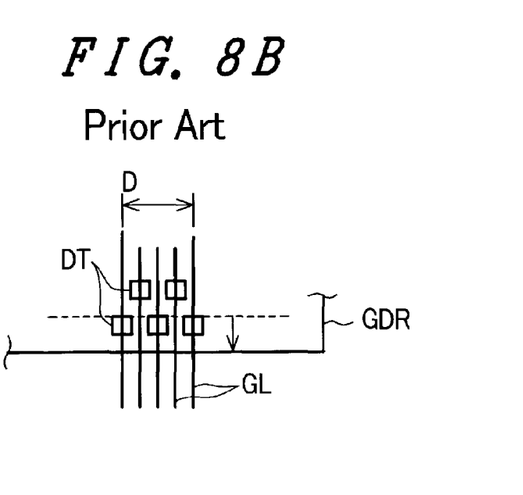

FIGS. 8A and 8B are partial views for explanation of the arrangement of a portion indicated by arrow "A" in FIG. 7. Additionally, FIG. 9 is a main-part plan view diagram for explanation of an arrangement example at the intermediate manufacture stage of the substrate which mounts thereon the drive circuit chip, and FIG. 10 is an explanation diagram of a connection state of either an output terminal or a dummy terminal of the drive circuit chip being mounted on the substrate with respect to a gate line. Reference character string "SUB1" designates the substrate (first substrate) used to mount the drive circuit chip; SUB2 indicates an opposite substrate (second substrate); PAD denotes power supply pads; CL is a cut line of the first substrate; SHT, electrical shorting line. The input wiring lines ITL are extended toward the power supply pads PAD as formed at a substrate end portion.

As shown in FIGS. 7 to 10, the dummy terminals DT on the lower peripheral edge side of the drive circuit chip GDR function to take a balance when mounting onto the substrate, together with the output terminals OT that are present on the upper peripheral edge side. The dummy terminals DT formed are the same in number as the output terminals OT, for taking a balance in the above-noted mounting event—more specifically, for preventing the drive circuit chip GDR from being mounted with a tilt. As shown in FIGS. 8A–8B, each gate line GL passes through a portion overlying the dummy terminal DT at the lower edge of the drive circuit chip GDR and is then connected to the shorting line SHT.

However, when providing the dummy terminals DT at the lower peripheral edge of the drive circuit chip GDR in units of respective gate lines GL, if these are formed in parallel to the aforesaid lower edge as shown in FIG. 8A, then a need is felt to expand the distance of respective gate lines GL in order to prevent unwanted contact between neighboring gate lines GL. As a result, the gate lines GL to be formed within a specified range D decrease in line number; thus, it is required to enlarge the size in a lateral direction along the lower edge of the drive circuit chip GDR.

Alternatively, as shown in FIG. 8B, when the dummy terminals are formed to have a zigzag shape at the lower peripheral edge of the drive circuit chip GDR while letting the gate lines GL that are formed within the specified range D be the same in number as the output terminals OT, it is necessary to enlarge an up-down direction size of the drive circuit chip GDR as indicated by an arrow.

In this way, with the prior art layout designs of the dummy terminals DT, there is a limit to the shrinkage of the outer shape of the drive circuit chip GDR. This means that it becomes difficult to reduce the area of the first substrate SUB1 which mounts thereon the drive circuit chip GDR and thus becomes one factor which constitutes a bar to miniaturization or "down-sizing" of the entirety of the display device.

It is therefore an object of the present invention to provide a display device capable of reducing the outer shape size of a drive circuit chip to be mounted on a substrate of the display device to thereby enable miniaturization as a whole.

SUMMARY OF THE INVENTION

To attain the foregoing object, the present invention has its principal feature in that the dummy terminals to be provided on the drive circuit chip are made greater in layout pitch than the drive lines while specifically arranging certain one or ones of the gate lines which extend at a substrate terminate end to pass through between adjacent ones of the dummy terminals. A description of some representative arrangements of this invention is as follows.

(1) In a display device which comprises a plurality of pixels disposed on a substrate in a matrix form and a drive circuit chip as mounted on the substrate for causing the pixels to perform a display operation, the drive circuit chip has a plurality of output terminals for connection to output wiring lines formed on the substrate and a plurality of dummy terminals disposed adjacent to one another, and at least one wiring line of the wiring lines connected to the output terminals is not connected to any one of the dummy terminals and is railed to extend between adjacent ones of the dummy terminals.

(2) In (1), the plurality of dummy terminals are substantially equal in layout pitch to or greater than the output terminals.

(3) In (1) or (2), the drive circuit chip has a total area of all terminals at a peripheral edge with provision of the dummy terminals, wherein the total area is equal to or more than twenty percent or more of a total area of all terminals at a peripheral edge opposing the above-noted peripheral edge.

(4) In any one of (1) to (3), the drive circuit chip is arranged so that the requisite number of the dummy terminals is one tenth or greater of the number of the output terminals.

(5) In any one of (1) to (4), an area per dummy terminal is made greater than an area per output terminal.

(6) In any one of (1) to (5), at least one wiring line of the wiring lines connected to the output terminals is connected to none of the dummy terminals and is railed to extend between the mutually adjacent dummy terminals as disposed along a different peripheral edge from a peripheral edge where the at least one wiring line is connected to the output terminals.

(7) In any one of (1) to (6), at least one wiring line of the wiring lines connected to the output terminals is wired so that it is connected to one of the dummy terminals.

(8) In any one of (1) to (7), the drive circuit chip is a scan drive circuit chip while letting the wiring line extending between the mutually adjacent dummy terminals be a scan signal line.

(9) In any one of (1) to (7), the drive circuit chip is a video signal drive circuit chip while letting the wiring line extending between the mutually adjacent dummy terminals be a video signal line.

(10) In any one of (1) to (9), the mutually adjacent dummy terminals are disposed along a specified peripheral edge which is far from the pixels at the drive circuit chip.

(11) In any one of (1) to (10), the pixels are designed to employ liquid crystal cells.

With the use of each of the arrangements stated above, it becomes possible to reduce or shrink the outer shape of the drive circuit chip to thereby enable provision of the intended display device which is capable of miniaturization as a whole.

It is to be noted that the present invention should not be limited only to the above arrangements and may also be applied similarly to cases where the drive circuit chip is a data drive circuit (drain drive circuit) and also applied to a variety of types of large-size and small-size display devices. And, needless to say, various modifications are possible without departing from the technical ideas of the invention as disclosed herein.

BRIEF DESCRIPTION OF THE DRAWINGS

FIGS. 8A and 8B are partial views each of which is for explanation of the arrangement of a portion indicated by arrow "A" in FIG. 7, wherein FIG. 8A shows a case where the dummy terminals are formed into a single linear array whereas FIG. 8B shows a case where the dummy terminals are formed into a zigzag shape.

DESCRIPTION OF THE PREFERRED EMBODIMENTS

Figure 1:
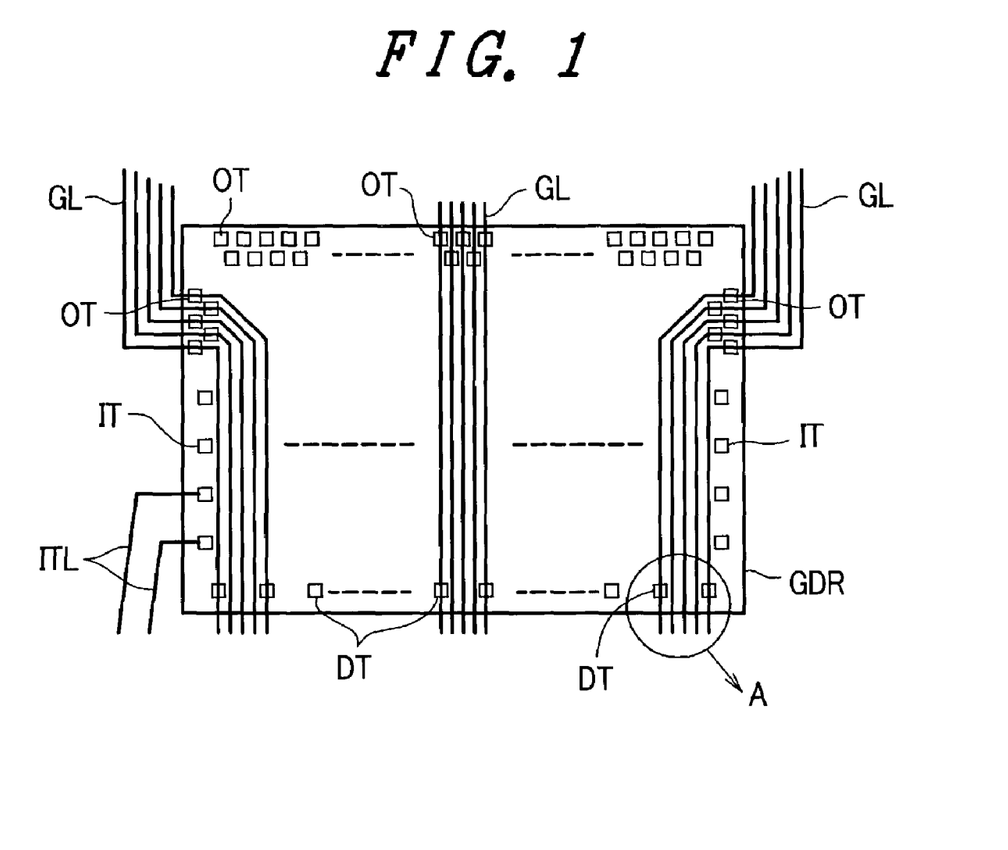
FIG. 1 is a diagram showing a pictorial representation for explanation of an arrangement of the ventral surface of a drive circuit chip which applies drive voltages to gate lines and which is one of drive circuits for drive voltage application to drive lines of a liquid crystal display device in accordance with a first embodiment of the display device of the present invention along with one example of a wiring line layout as formed on a substrate

A preferred form of the present invention will now be explained in detail below with reference to the accompanying drawings of an embodiment which applies the invention to a liquid crystal display device. FIG. 1 is a diagram showing a pictorial representation for explanation of an arrangement of the ventral surface of a drive circuit chip which applies a drive voltage(s) to gate lines and which is one of drive circuits for drive voltage application to drive lines of the liquid crystal display device in accordance with a first embodiment of the display device of the present invention along with one example of a wiring line layout which is formed on a substrate.

A drive circuit chip GDR has on its ventral surface indicated by solid outlines a great number of input terminals IT normally called bumps along with multiple output terminals OT and dummy terminals DT, which ventral surface will be mounted onto a first substrate with input wiring lines ITL and gate wiring lines GL formed thereon.

In this example, it has input terminals IT along the right and left peripheral side edges of the drive circuit chip GDR when seeing the drawing sheet of FIG. 1. The input wiring lines ITL are formed on the substrate side in a way corresponding to these input terminals IT. Note that the same goes with a case where the input terminals IT are provided up to the right and left terminate ends of a lower peripheral edge of the drive circuit chip GDR.

The output terminals OT for connection to gate lines GL as formed in a display region which is placed at upper part of FIG. 1 although not specifically depicted herein are located at portions of the upper and right/left peripheral edges of the drive circuit chip GDR, with the dummy terminals DT being formed along the lower edge. Note here that the output terminals OT should not be limited to the three-edge layout design such as shown in FIG. 1 and may alternatively be modified so that these are provided only at two peripheral edges or a single edge.

Figure 2:
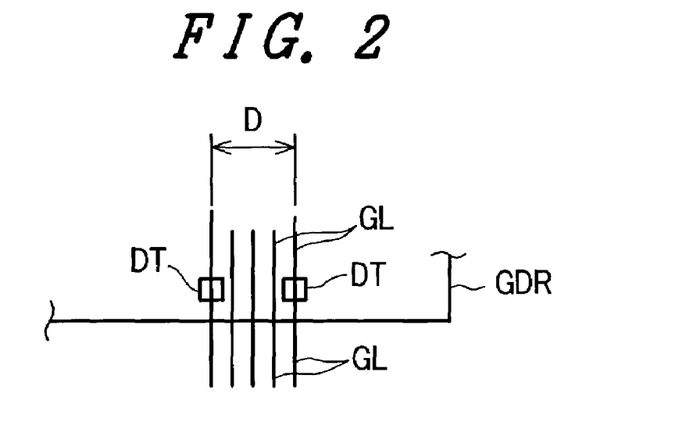
FIG. 2 is a partial view for explanation of an arrangement of a portion indicated by arrow "A" in FIG. 1.
Figure 3:
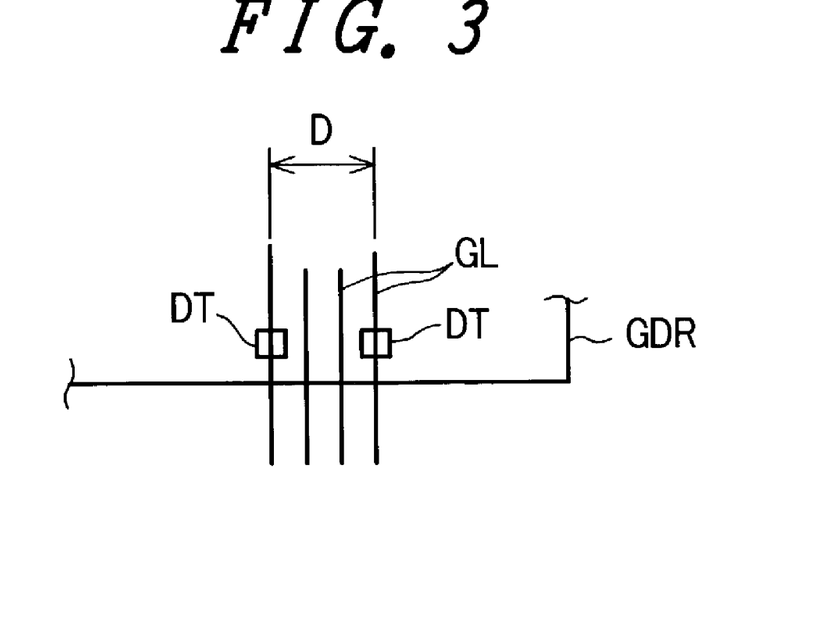
FIG. 3 is a partial view for explanation of another arrangement of a portion indicated by arrow "A" in FIG. 1.
Figure 4:
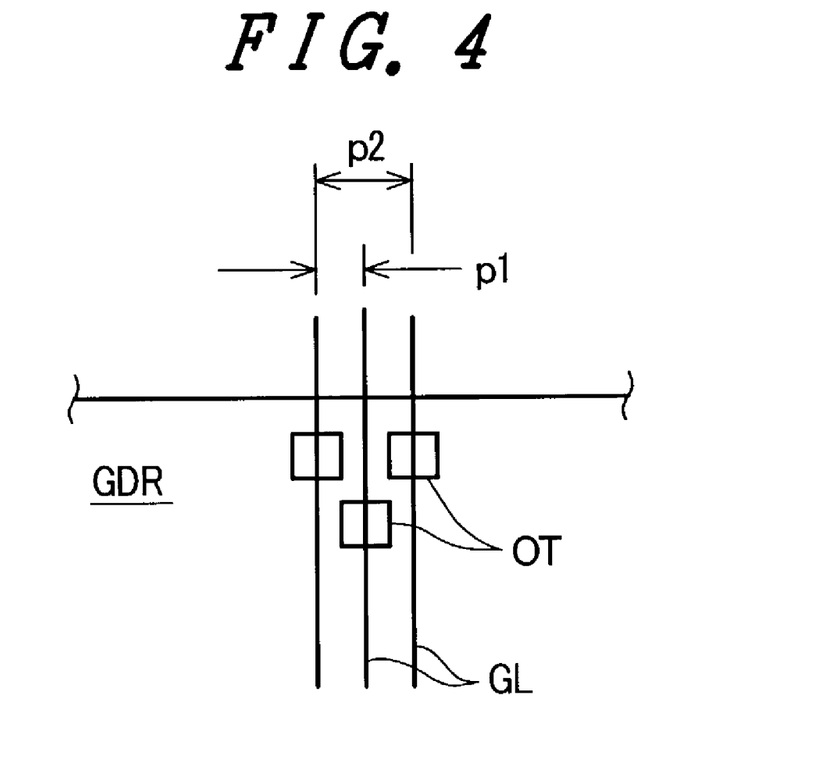
FIG. 4 is a partial view for explanation of an arrangement of an output terminal portion of the drive circuit chip in FIG. 1.

FIGS. 2 and 3 are diagrams each of which shows a partial view for explanation of the arrangement of a portion indicated by arrow "A" in FIG. 1. In addition, FIG. 4 is a partial view for explanation of the arrangement of an output terminal portion of the drive circuit chip. The output terminals OT that are formed at an upper peripheral edge of the drive circuit chip GDR are formed to have a zigzag shape along this upper edge for providing a clearance between the neighboring output terminals OT to thereby prevent unwanted contact between adjacent ones of the output terminals OT.

As shown in FIG. 1, certain ones of the gate lines GL extending from the display region are connected to the output terminals OT which are formed on the drive circuit chip GDR and railed to run under the ventral surface of the drive circuit chip GDR and then extend up to a terminate end face of the substrate through the dummy terminals DT at the lower peripheral edge. The other ones of the gate lines GL extending from the display region are connected to the output terminals OT that are formed on the drive circuit chip GDR and are railed to run under the ventral surface of the drive circuit chip GDR and then pass through between the dummy terminals DT at the lower edge to reach the terminate end face of the substrate.

In FIG. 2, the gate lines that extend between the dummy terminals DT to reach the terminate end face of the substrate are set at three lines; in FIG. 3, they are two lines. Optionally the gate line(s) GL extending between the dummy terminals DT with a prespecified pitch D may be set at a single line or more than four lines in accordance with the line width of the gate line GL used. The pitch D of the dummy terminals DT is made greater than the pitch of the output terminals OT. The pitch of output terminals OT is a pitch p1, which is a smaller value that is obtained when measurement is done between inside and outside ones in case the output terminals OT are in the zigzag layout (see FIG. 4). Furthermore, it is preferable that the pitch D be made greater than a pitch p2 which is obtainable when measurement is done between outside ones.

As previously explained in conjunction with FIG. 9, at the intermediate manufacture stage of this liquid crystal display device, more than one electrical shorting line is provided at a further lower portion of the lower peripheral edge of the substrate which mounts thereon the drive circuit chip GDR, with the above-noted gate lines GL connected to this shorting line. The short line is to be cut and removed away together with the substrate at a pre-stage at which it becomes a final product. With such an arrangement, at least one of electrostatic remedy, open-circuit inspection and anode oxidation is made possible.

In this way, when railing the gate lines GL through the ventral surface of the drive circuit chip GDR, letting specified one or ones of them penetrate between adjacent ones of the dummy terminals makes it possible to provide a clearance between wire leads with respect to both the dummy terminals DT and the gate lines GL.

With such the arrangement of this embodiment, no dummy terminals are present over the gate lines so that it is possible to acquire a balance in parts-mount events of the drive circuit chip GDR while ensuring that any adjacent gate lines do not come into contact with each other without increasing the dummy terminals in number. As a result, it is no longer required to enlarge the outer shape of the drive circuit chip, which in turn makes it possible to permit the drive circuit chip to shrink in outer shape in accordance with a decrease in line width of the gate lines; thus, it becomes possible to miniaturize the liquid crystal display device as a whole.

In this way, according to the illustrative embodiment, when railing the gate lines GL in such a way as to extend through the ventral surface of the drive circuit chip GDR, it is possible to acquire the clearance between the dummy terminals DT and the wiring lines GL not by forcing them to run via the dummy terminals DT without fail but by "thinning out" the dummy terminals DT; thus, it is possible to rail the gate lines GL at high densities. As a result, it becomes possible to shrink the outer shape of the drive circuit chip GDR.

In order to provide the mounting balance (parallelism relative to the substrate surface) with respect to the peripheral edge on the output terminal OT side as a result of the thin-out of the dummy terminals DT of the drive circuit chip GDR, that is, in order to avoid any unwanted inclination or tilting of the drive circuit chip GDR with respect to the substrate by application of the compressive force of a thermal adhesion tool upon mounting of the drive circuit chip GDR to the substrate, it should be required to design a total area of the terminals that are present at the peripheral edge along which the dummy terminals DT are provided (for the one that includes additional terminals such as for example input terminals IT other than the dummy terminals DT, a total of such input terminals IT and the dummy terminals DT) to have a prespecified significance.

From parts-mounting experiences in actual manufacturing processes, it is preferable that the total area of the terminals placed at the peripheral edge on the dummy terminal DT side which can hold the parallelism relative to the substrate surface while withstanding the compressive force of the above-stated thermal adhesion tool be set at equal to or more than twenty percent (20%) of an all-terminal area of the terminals at an opposite peripheral edge (here, the output terminal OT layout edge) to the peripheral edge on the dummy terminal DT side, that is, the area of all the output terminals OT; more preferably, let it be set at equal to or more than 35%. In addition, it is preferable that an upper limit of the total area of the terminals which reside at the peripheral edge on this dummy terminal side be less than 100%—more preferably, equal to or less than 50% at the maximum in the sense of acquiring the wiring space of the gate lines GL. Note here that if the ability to withstand the compressive force is available then the total terminal area upper limit may be modified to be out of these numerical value ranges.

Additionally, there is also a remedy which takes into consideration the terminal number of the peripheral edge on the dummy terminal layout side in order to acquire the above-mentioned mounting balance. The terminal number of the peripheral edge on the dummy terminal layout side is preferably set at a carefully chosen value which is equal to or greater than one tenth (1/10)—more preferably, equal to or greater than one fifth (1/5)—of the total terminal number of the output terminals OT. In a similar way to the aforesaid terminal area definition, the upper limit of the terminal number of the peripheral edge on the dummy terminal layout side is preferably less than one time of the total terminal number of the output terminals OT; more preferably, the former is equal to or less than one second (1/2) of the latter. Note that if the ability to withstand the compressive force is guaranteed then the upper limit may be modified to go beyond these numerical value ranges.

Figure 5:
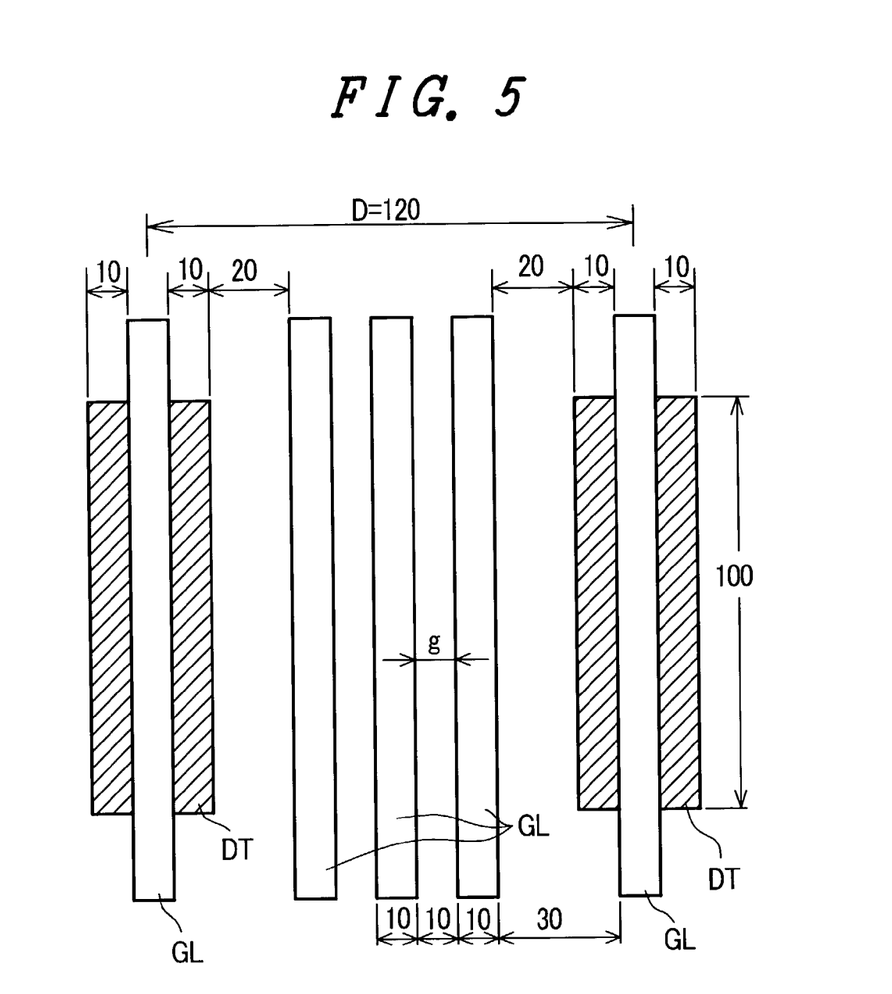
FIG. 5 is an explanation diagram of a practical size design example of gate lines near dummy terminals and the dummy terminals of the drive circuit chip of the present invention.

FIG. 5 is an explanation diagram of a practical size design example of gate lines adjacent to dummy terminals and the dummy terminals of the drive circuit chip of the present invention. Illustrated here is the case where three gate lines GL extend and penetrate between adjacent dummy terminals DT. The line width of each gate line GL passing between the dummy terminals DT is set at 10 $\mu$m, a gap g of the gate lines GL is 10 $\mu$m, a gap between one dummy terminal DT and an outside one of the gate lines GL passing between the dummy terminals DT is 20 $\mu$m, the pitch D between the dummy terminals DT is 120 $\mu$m, the width of a dummy terminal DT is 30 $\mu$m, and the length of dummy terminals DT along the gate lines GL is 100 $\mu$m.

The length of the dummy terminals DT along the gate lines GL is specifically designed to be greater than the length of those terminals laid out at the output terminal OT layout edge, that is, the output terminals OT. Additionally the length of the output terminals OT is 95 $\mu$m, the width is 30 $\mu$m, the pitch p1 of FIG. 4 is equal to 40 $\mu$m, and the pitch p2=80 $\mu$m. This length of the dummy terminals DT is set up in accordance with the number of the terminals placed at the dummy terminal layout edge whereas the area of dummy terminal DT is set in such a way that it is well balanced with the output terminal OT layout edge during mounting. In this way, letting the area per dummy terminal be greater than the area per output terminal OT makes it possible to establish enhanced balance equilibrium during mounting while using a decreased number of dummy terminals. The arrangement is not limited to the design scheme explained above and may be modified so that the same length is used with the area per single terminal equalized.

Although the above-noted embodiment is explained in relation to the drive circuit chip for gate drive use, the same goes with a drive circuit chip for drain drive use.

Figure 6:
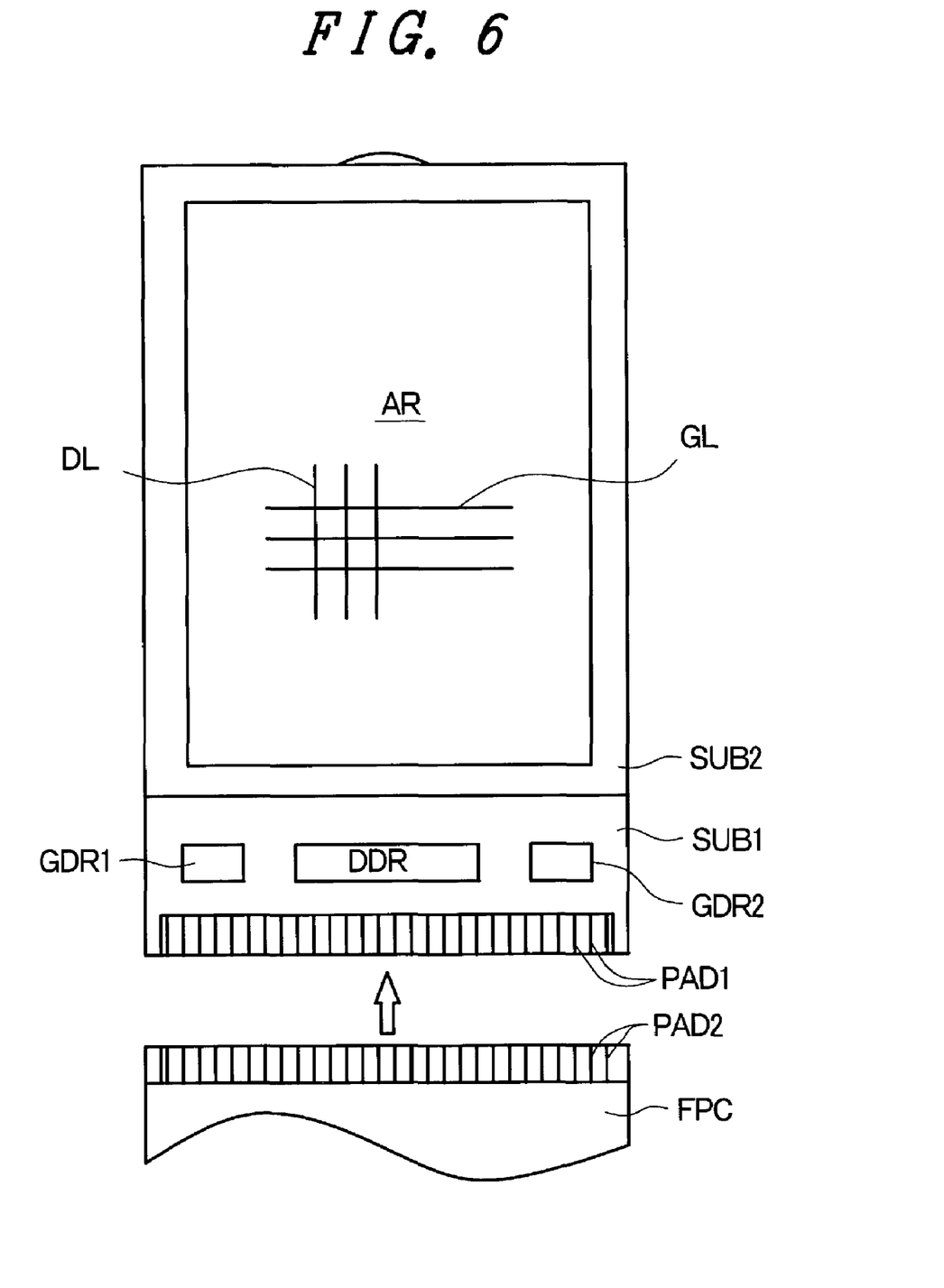
FIG. 6 is a plan view diagram for explanation of an arrangement example of a liquid crystal display device for use with mobile radiotelephone handsets, which is a typical example of the display device of the present invention.

FIG. 6 is a plan view diagram for explanation of an arrangement example of a liquid crystal display device for use with a mobile radiotelephone handset, which is a typical example of the display device of the present invention. This liquid crystal display device is arranged by sealing a liquid crystal material into a gap space between a first substrate SUB1 and a second substrate SUB2 which are adhered together, railing a plurality of gate lines GL and a plurality of drain lines DL on an inside surface of the first substrate SUB1 into a matrix form, and disposing at locations in close proximity to the cross-points or intersections thereof a plurality of pixels each having a switching element and a pixel electrode into a matrix form to thereby provide a display region AR.

The first substrate SUB1 has on its one peripheral edge side a drive circuit mounting region which is overextended from the second substrate SUB2, wherein a drive circuit chip DDR for drain-line drive use and two separate drive circuit chips GDR1, GDR2 for gate-line drive use are mounted in this drive circuit mount region. At the lower terminate end of the drive circuit mount region of the first substrate SUB1, pads PAD1 are formed for supplying signals and voltages to the drive circuit chip DDR and the drive circuit chips GDR1, GDR2 for gate-line drive use and also to opposite or "counter" electrodes and others which are provided on the second substrate SUB2.

These pads PAD1 are such that pads PAD2 of a flexible printed wiring board FPC are connected thereto while permitting the above-noted signals and voltages to be supplied to the pads PAD1 from external signal processor circuitry via the flexible printed wiring board FPC. It should be noted that although in FIG. 6 both the drive circuit chip DDR for drain-line drive use and the two drive circuit chips GDR1, GDR2 for gate-line drive use are mounted in the drive circuit mount region, the two drive circuit chips GDR1, GDR2 for gate-line drive use may be integrated together into a single semiconductor chip (GDR) when the need arises. Alternatively, the drive circuit for gate-line drive use and the drive circuits for drain-line drive use may be modified so that these are organized into a single semiconductor chip.

Still alternatively, it is also possible to mount the drive circuit chip DDR for drain-line drive use alone in the drive circuit mount region while mounting the drive circuit chip GDR (or chips GDR1, GDR2) for gate-line drive use on the flexible printed wiring board FPC side. Additionally this type of small size liquid crystal display device is designed to have a control circuit such as a timing controller (TCON) or the like in the drive circuit chip DDR for drain-line drive use while eliminating the use of any interface circuit board or substrate which is customarily employable in large-size liquid crystal display devices.

Obviously, the present invention should not be limited only to the above-stated small size liquid crystal display device and may also be applied in a similar way to notebook personal computers (PCs) and desktop computers and other relatively large sized display devices. In addition, with regard to display devices which require illumination light rays, the invention is applicable to any types of display devices including but not limited to transmission type ones, reflective ones, partial transmissive ones, or half or semi-transmissive ones.

To make a long story short, even in the case where multiple chips including the drive circuit chip for drain-line drive use and more than one drive circuit chip for gate-line drive use are mounted along two peripheral edges of a display device, the embodiment of the instant invention is applicable in a similar way to the case of extending its gate lines or drain lines up to a substrate end portion through the ventral surface of a drive circuit chip.

Although the above embodiment has been explained with respect to the active-matrix liquid crystal display (AMLCD) device, it may also be applied to mounting and wiring processing of drive circuit chips for use in a wide variety of types of display devices including simple-matrix liquid crystal display devices, ones using thin-film diodes as switching elements, organic ELs, plasma displays, FEDs, and others. Additionally the substrates for use with these ones should not be limited only to glass plates or glass-based plates and may alternatively be formed of resin plates depending upon a certain type or types of the display devices.

As has been explained above, according to the present invention, it becomes possible to reduce or shrink or minimize the outer shape of a variety of drive circuit chips to be mounted on the substrate while at the same time maintaining the balance during mounting onto the substrate surface, which in turn makes it possible to provide the display device of low costs which enables achievement of miniaturization or down-sizing as a whole.

What is claimed is:

1. A display device comprising a plurality of pixels disposed on a substrate in a matrix form and a drive circuit chip as mounted on the substrate for causing the pixels to perform a display operation, wherein the drive circuit chip has a plurality of output terminals and a plurality of dummy terminals, the plurality of output terminals are respectively connected to wiring lines formed on the substrate, the plurality of dummy terminals are disposed adjacent to one another, and at least one wiring line of the wiring lines connected to the output terminals is prevented from being connected to the dummy terminals and is railed to extend between adjacent ones of the dummy terminals such that only said at least one wiring line is disposed between said adjacent ones of the dummy terminals.

2. The display device as recited in claim 1, wherein the plurality of dummy terminals are substantially equal in layout pitch to or greater than the output terminals.

3. The display device as recited in claim 1, wherein the drive circuit chip has a first peripheral edge with provision of the dummy terminals, and that a total area of the dummy terminals on the first peripheral edge is at least twenty percent of a total area of terminals at a second peripheral edge opposing the first peripheral edge.

4. The display device as recited in claim 1, wherein a number of the dummy terminals is at least one tenth of a number of the output terminals.

5. The display device as recited in claim 1, wherein an area per dummy terminal is greater than an area per output terminal.

6. The display device as recited in claim 1, wherein at least one wiring line of the wiring lines connected to the output terminals and connected to none of the dummy terminals is railed to extend between the mutually adjacent dummy terminals as disposed along a different peripheral edge from a peripheral edge where the at least one wiring line is connected to the output terminal.

7. The display device as recited in claim 1, wherein at least one wiring line of the wiring lines connected to the output terminals is wired and connected to one of the dummy terminals.

8. The display device as recited in claim 1, wherein the drive circuit chip is a scan drive circuit chip and that the wiring line extending between the mutually adjacent dummy terminals is a scan signal line.

9. The display device as recited in claim 1, wherein the drive circuit chip is a video signal drive circuit chip and that the wiring line extending between the mutually adjacent dummy terminals is a video signal line.

10. The display device as recited in claim 1, wherein the dummy terminals are disposed along a peripheral edge farthest from the pixels among peripheral edges of the drive circuit chip.

11. The display device as recited in claim 1, wherein the pixels are pixels of a liquid crystal display device.

* * * * *